United States Patent
Sakoda et al.

(10) Patent No.: US 6,532,223 B1
(45) Date of Patent: *Mar. 11, 2003

(54) COMMUNICATION METHOD, TRANSMISSION METHOD, RECEPTION METHOD, BASE STATION AND TERMINAL

(75) Inventors: Kazuyuki Sakoda, Tokyo (JP); Mitsuhiro Suzuki, Chiba (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,616

(22) Filed: Sep. 28, 1998

(30) Foreign Application Priority Data

Sep. 30, 1997 (JP) ................................. 9-267374

(51) Int. Cl.⁷ ............................... H04J 3/00; H04J 3/17
(52) U.S. Cl. ................. 370/337; 370/328; 370/329; 370/330; 370/331; 370/332; 370/336; 370/345; 370/347; 370/436; 370/442; 370/478; 370/496; 455/436; 455/440
(58) Field of Search ............................. 370/328, 329, 370/330, 331, 332, 336, 337, 343, 344, 345, 346, 347, 348, 433, 436, 437, 442, 443, 458, 459, 465, 468, 477, 478, 480, 496, 529; 455/436, 440, 451, 452, 456

(56) References Cited

U.S. PATENT DOCUMENTS

| 5,210,752 A | * | 5/1993 | Ito et al. ..................... 370/95.1 |
| 5,345,448 A | * | 9/1994 | Keskitalo ................... 370/95.3 |
| 5,485,635 A | * | 1/1996 | Paavonen .................. 455/54.1 |
| 5,625,629 A | * | 4/1997 | Wenk ......................... 370/347 |
| 5,778,318 A | * | 7/1998 | Talarmo et al. ............ 455/452 |
| 6,016,311 A | * | 1/2000 | Gilbert et al. .............. 370/280 |
| 6,021,330 A | * | 2/2000 | Vannucci ................... 455/456 |
| 6,181,941 B1 | * | 1/2001 | McCarthy ................... 455/436 |

* cited by examiner

Primary Examiner—Hassan Kizou
Assistant Examiner—Joe Logsdon
(74) Attorney, Agent, or Firm—Jay H. Maioli

(57) ABSTRACT

A terminal in a wireless telephone system can efficiently search for available base stations. Communication of user information between a base station and a terminal is intermittently performed in a predetermined time slot period. The transmission and reception of user information at the terminal are stopped at once in a plurality of predetermined time slot periods in such intermittent communication. The cell search for receiving a frequency channel in which control information is transmitted from the base station is performed, so that available base stations are searched. The number of cell search periods can be increased or decreased from time to time.

30 Claims, 8 Drawing Sheets

COMMUNICATION METHOD, TRANSMISSION METHOD, RECEPTION METHOD, BASE STATION AND TERMINAL

BACKGROUND OF THE INVENTION

1. Field of the Invention

The present invention relates to a communication method, a transmission method, and a reception method suitable for application to a wireless telephone system according to cellular communication system, for example, and to a base station and a terminal based on these methods, and more particularly relates to those suitable for application of the TDMA (Time Division Multiplex Access) method.

2. Description of the Related Art

Various wireless telephone systems for wireless transmitting digital data signals are developed and put to practical use. A method for efficient connection which is practically used, is to apply the TDMA method. Said method allows a plurality of terminals to be connected with a base station in a single transmission band (frequency channel) by dividing the single transmission band into time slots on a time axis and allocating each time slot to the plurality of terminals (mobile station).

FIG. 1 shows an example of channel configuration for a wireless telephone system according to the cellular communication system using the conventional TDMA method. The ordinate indicates frequencies, and the abscissa indicates the lapse of time. The frequency axis has one band slot formed by every predetermined frequency band (for example, several kHz) and these band slots are numbered (herein, consecutively numbered). The time axis has one time slot formed for every predetermined period of time (for example, several hundreds $\mu$ sec) and these time slots are numbered (herein, consecutively numbered).

Predetermined band slots (in the example of FIG. 1, the thirteenth band slot and the twenty-third band slot) are allocated as band slots dedicated only to control channel CCH (Common Control Channel) transmission. In said band slots for control channel CCH, all the time slots are occupied with the control channel. In this connection, adjacent base stations have different band slots allocated to their control channels. For example, one base station performs its control channel CCH transmission at the thirteenth band slot, and another base station adjacent to said base station performs its control channel CCH transmission at the twenty-third band slot.

Other band slots (in the example of FIG. 1, the first to twelfth band slots, the fourteenth to twenty-second band slots, and the twenty-fourth to thirty-seventh band slots) are allocated as transmission bands to information transmission channel TCH (Traffic Channel) in which call audio data or other various data (hereinafter, referred to as user information) is to be transmitted. The setting of information transmission channel TCH at said transmission bands is communicated from a base station through the control channel to each terminal. Therefore, when being connected each terminal with the base station, a band slot in which the control channel CCH is transmitted, is received at first. The band slot and the time slot allocated to said terminal for transmitting the user information are determined based on the control information indicated by the control channel CCH transmitted in said band slot, so as to start the communication with the base station at said band slot and said time slot.

The thirty-sixth band slot in FIG. 1 shows an state of communication between the base station and a terminal. Referring to FIG. 2 which is an enlarged view of a portion of said band slot, said example shows three slots constituting one TDMA frame in which the communication is performed within three time slot periods. At a location of the time slot number 1, the transmission slot Tx for transmission of user information from the base station to the terminal has a length of one time slot period. At the next location of the time slot number 2, the reception slot Rx for reception of user information from the base station to the terminal has a length of one time slot period. At the next location of the time slot number 3, both the transmission and the reception pause for one time slot period. At the succeeding locations, the process of these three time slot periods (the process of one TDMA frame) is repeated. In this connection, the transmission slot and the reception slot are designated from the viewpoint of the base station, and of course, these slots are reversed from the viewpoint of the terminal.

Within a period over which the transmission and reception of user information pause (for example, the time slots number 3, 6, and 9), the search operation for available base stations is performed. That is, with a wireless telephone system according to the cellular communication system, areas where each base station can communicate are normally arranged in consecutive cells, and each terminal must determine which base station can communicate with it. Specifically, the control channel CCH transmitted from the base station is received by the terminal. Then, the terminal determines which base station it can communicate with based on the received field intensity or the like, and makes a request for connection with the base station with which the terminal can communicate. Therefore, each terminal must perform the search operation to search for a base station cell where said terminal can communicate at that point of time. Even after the communication starts, if the terminal moves into another area, the handoff process for switching the base stations for communication is required. Therefore, during a call, the search operation must be performed to find out available base stations from time to time.

The example shown in FIG. 2 shows the case where a frequency channel (band slot) is occupied with a terminal and however, depending on the setting state of period to arrange transmission slots Tx and reception slots Rx, a plurality of terminals can be connected with a channel. For example, another example of FIG. 3 shows eight time slots constituting one TDMA frame. The first of the eight time slots in said TDMA frame is a reception slot Rx for reception of user information from the terminal. The fourth time slot is a transmission slot Tx for transmission of user information from the base station. With this configuration, if the transmission and reception operations are performed at the same frequency, one TDMA frame allows four slots to be set for transmission and reception so that four terminals can share a band slot. Also in the example of FIG. 3, within a predetermined period of slot in each TDMA frame in which neither transmission nor reception of user information is performed by each terminal (herein, for example, the sixth and seventh time slots), the search operation is to be performed to find out available base station.

For the communication state shown in FIG. 2, if the incoming line and the outgoing line are at different frequency bands from each other, separately for each line, a terminal can communicate with the base station within a period of three time slots, and therefore three terminals can share a frequency channel (a band slot).

In either configuration, a period in which the cell search operation is performed for each TDMA frame is made available to each terminal. During said period, a process is performed to receive control channels. For such a configuration that the cell search operation is to be performed for each TDMA frame, it is not easy to deal with more frequent or less frequent cell search. In order to perform the cell search for each TDMA frame as shown in FIG. 2, one TDMA frame must be composed of at least three time slots and it is impossible to provide one TDMA frame composed of two time slots.

When communication is performed between the base station and the terminal in the configuration described above, appropriate control over the power of signals transmitted from the terminal can make the communication state better, as well as can be also desirable in power consumption of the terminal. That is, since a wireless telephone system includes a plurality of terminals which are located randomly, a terminal can make communication in the vicinity of any base station or a terminal can make communication at a location distant from any base station. Therefore, it is not desirable to perform all the transmission operations at a fixed level of power. If the transmission power from a terminal can be controlled appropriately, a lower transmission power is set when the communication is performed in the vicinity of the base station, and a higher transmission power is set when the communication is performed at a location distant from the base station. Thereby, waste of power consumption can be avoided during the transmission process at terminals, and the level of interference with other communication operations can be minimized. However, a complicated process is required to appropriately control the transmission power at a terminal, and the control of transmission power, in fact, is not performed generally.

SUMMARY OF THE INVENTION

In view of the foregoing, an object of this invention is to provide an efficient search for available base stations at a terminal.

Another object of the invention is to appropriately establish conmmunication between a terminal and a base station depending on the location of the terminal at the point of time.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described below with reference to FIGS. 4 to 10.

In this embodiment, the present invention is applied to a wireless telephone system of the cellular communication system, and a configuration of the communication system to which the embodiment is applied is described first. The configuration of communication system according to the embodiment is basically constructed as a system for communication according to the TDMA method, and uses multicarrier signals as a signal to be transmitted in each time slot. That is, said configuration is based on a so-called multicarrier system where a plurality of sub-carriers are consecutively arranged within a previously allocated band and the plurality of sub-carriers within one band are simultaneously used in one transmission path. Moreover, the plurality of sub-carriers within one band are time-divided all together for modulation.

Figure 6:
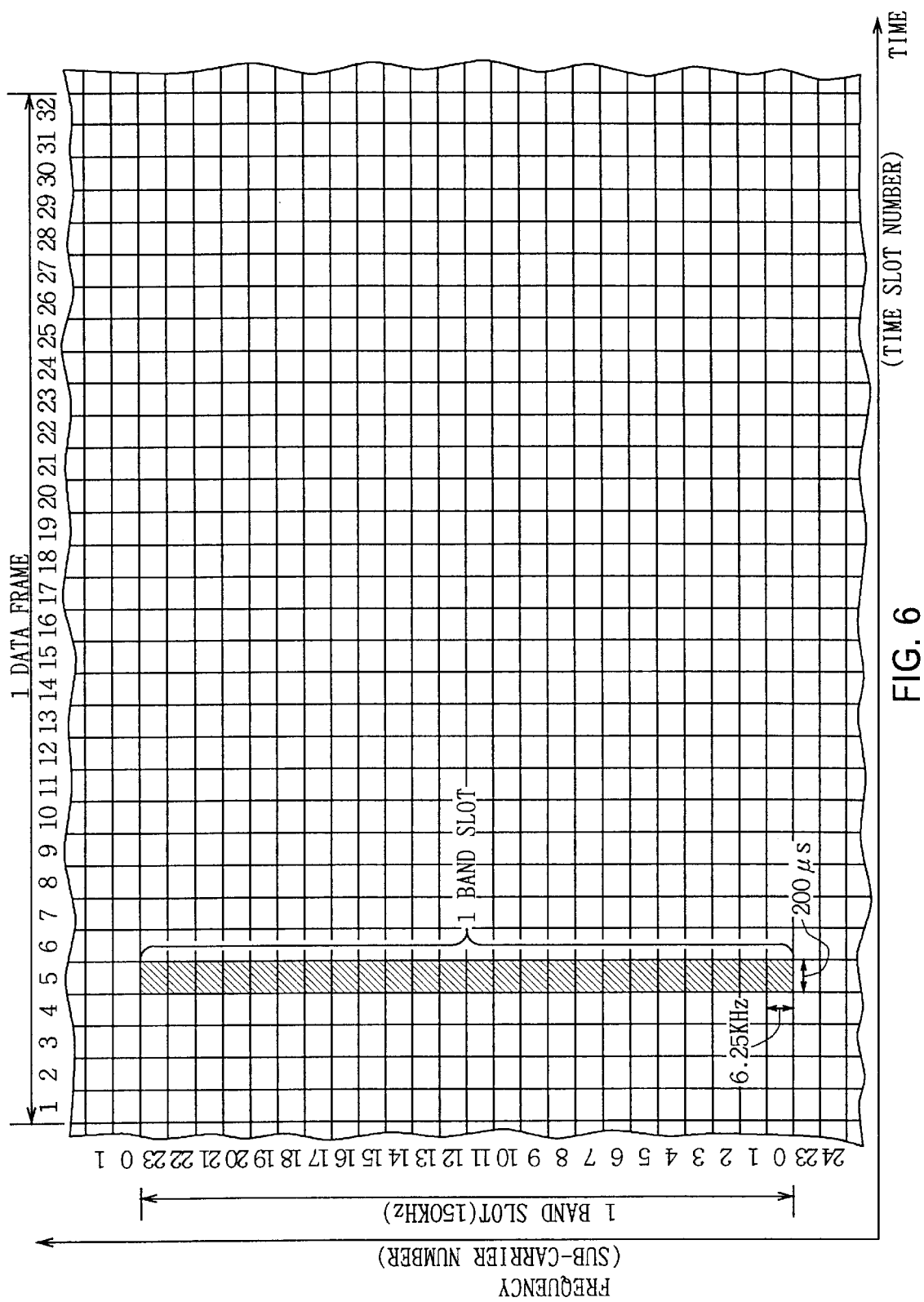
FIG. 6 is an explanatory drawing showing the slot configuration for transmission signals according to an embodiment of the present invention.
Figure 7:
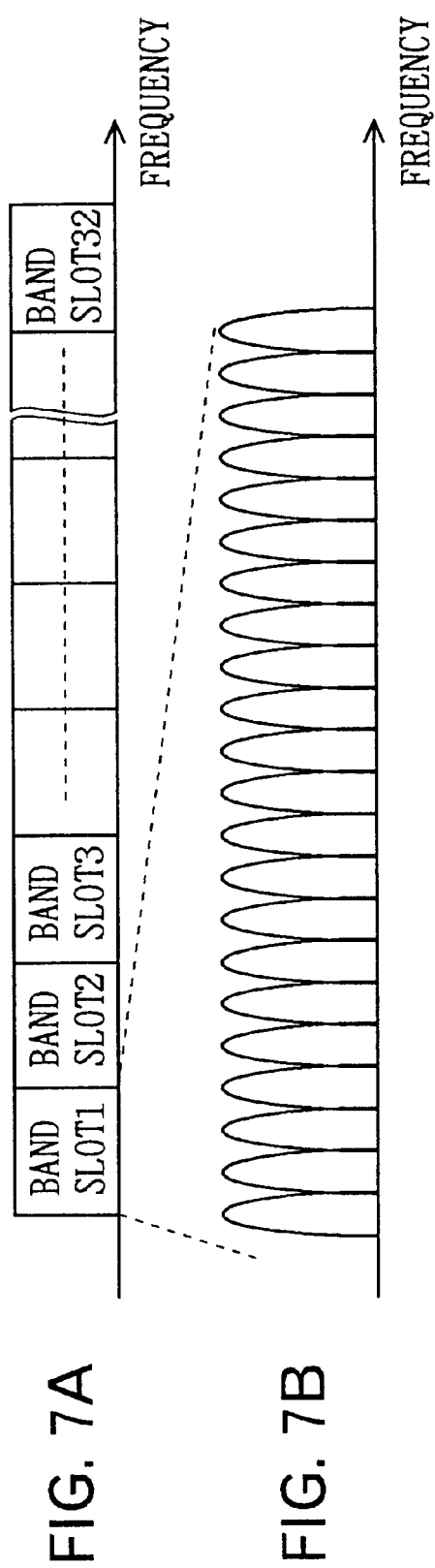
FIGS. 7A and 7B are explanatory drawings showing the band slot arrangement according to an embodiment of the present invention.

Now, the configuration of access method is described below in detail. FIG. 6 shows the slot configuration of transmission signals according to the present embodiment. The ordinate indicates frequency, and the abscissa indicates time. With this embodiment, the frequency axis and the time axis are divided into a grid to form an orthogonal basis. That is, one transmission band (one band slot) is given 150 kHz, and twenty-four sub-carriers are arranged within said one transmission band of 150 kHz. These twenty-four sub-carriers are consecutively arranged with an equal spacing of 6.25 kHz and they are numbered 0 through 23. It should be appreciated, however, that the number of sub-carriers which actually exist is twenty-two, that is, the sub-carriers 1 through 22 and that the sub-carriers 0 and 23 located at the ends of the band slot are called guard bands with no sub-carrier nor power. The difference in phase between two of twenty-two sub-carriers causes user information to be modulated for transmission.

A predetermined number of thus configured band slots form a unit of transmission on a certain frequency axis. For example, assume that thirty-two band slots is one unit of transmission on a certain frequency axis. As shown in FIG. 7A, thirty-two consecutive band slots are used as a unit of transmission on a certain frequency axis. As shown in FIG. 7B, a multicarrier signal composed of twenty-two sub-carriers signal is used for transmission in each band slot. A frequency channel for a predetermined number of band slots (herein, one frequency channel for every eight band slots) is used as a channel for transmission of control information. The configuration for transmission of said control information is described later in detail.

Returning to FIG. 6, the configuration of time axis is described below. In the figure, a time slot has an interval of 200 $\mu$ sec and a burst signal is modulated into twenty-two sub-carriers for every time slot for transmission. Herein a frame is defined as an arrangement of sixteen time slots. These sixteen time slots within a frame are consecutively numbered. The range shown in FIG. 6 by hatching indicates a time slot within a band slot.

Multiple accesses where a base station simultaneously communicates with a plurality of terminals are accomplished by using the orthogonal basis formed by dividing the frequency axis and the time axis into a grid. By setting such a communication state, a signal to be transmitted between each terminal and the base station is kept orthogonal to other signals and therefore only an appropriate signal can be acceptably extracted without any interference by other signals.

Now, the configuration of a base station which communicates with a terminal in the above-mentioned system configuration is described below with reference to FIG. 4.

Figure 1:
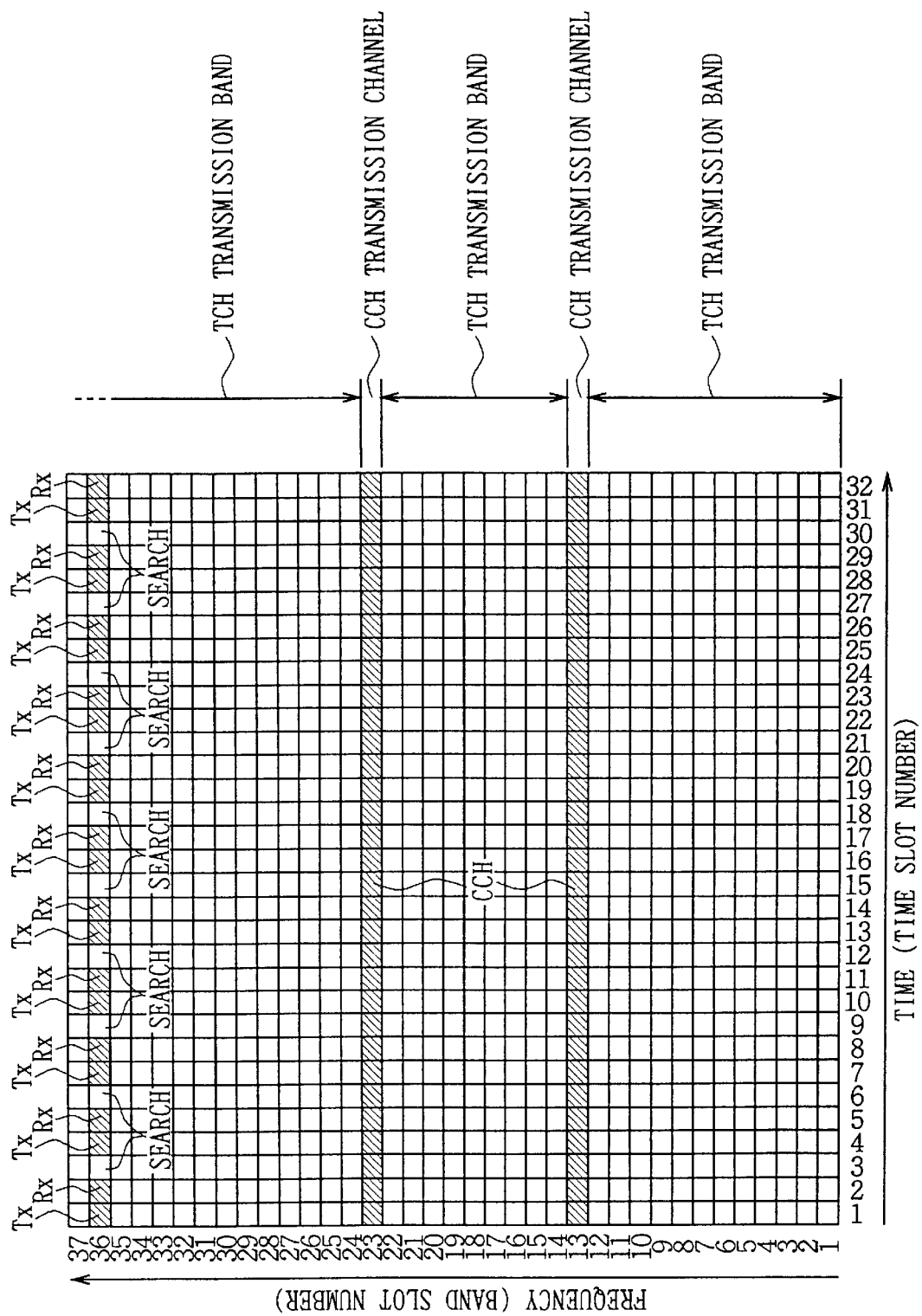
FIG. 1 is an explanatory drawing showing the channel configuration according to a prior cellular communication system.
Figure 2:
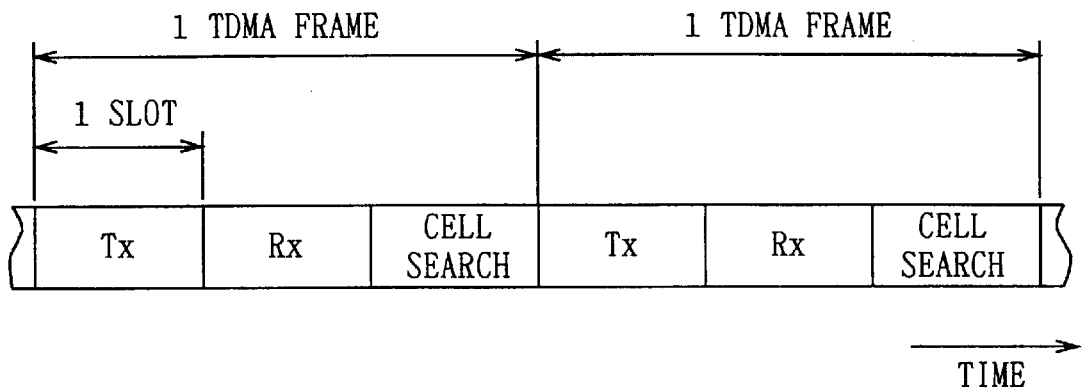
FIG. 2 is an explanatory drawing showing an example of prior communication timing.
Figure 3:
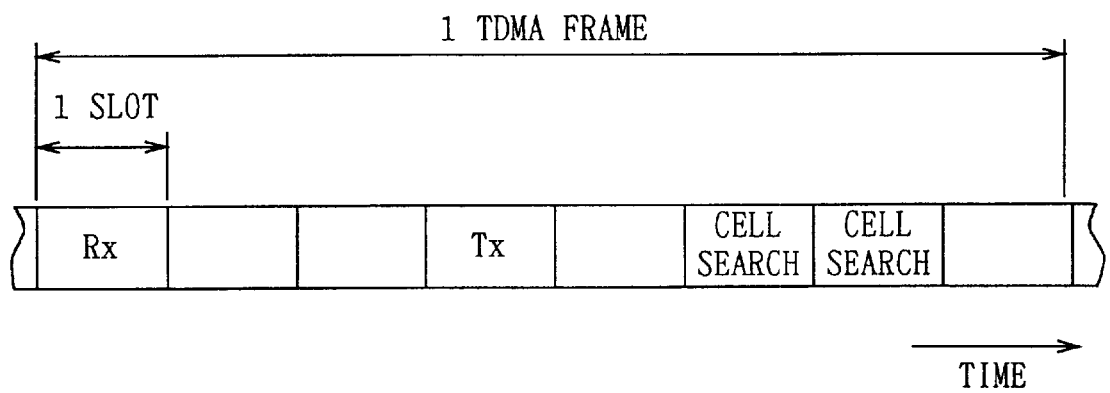
FIG. 3 is an explanatory drawing showing another example of prior communication timing.
Figure 4:
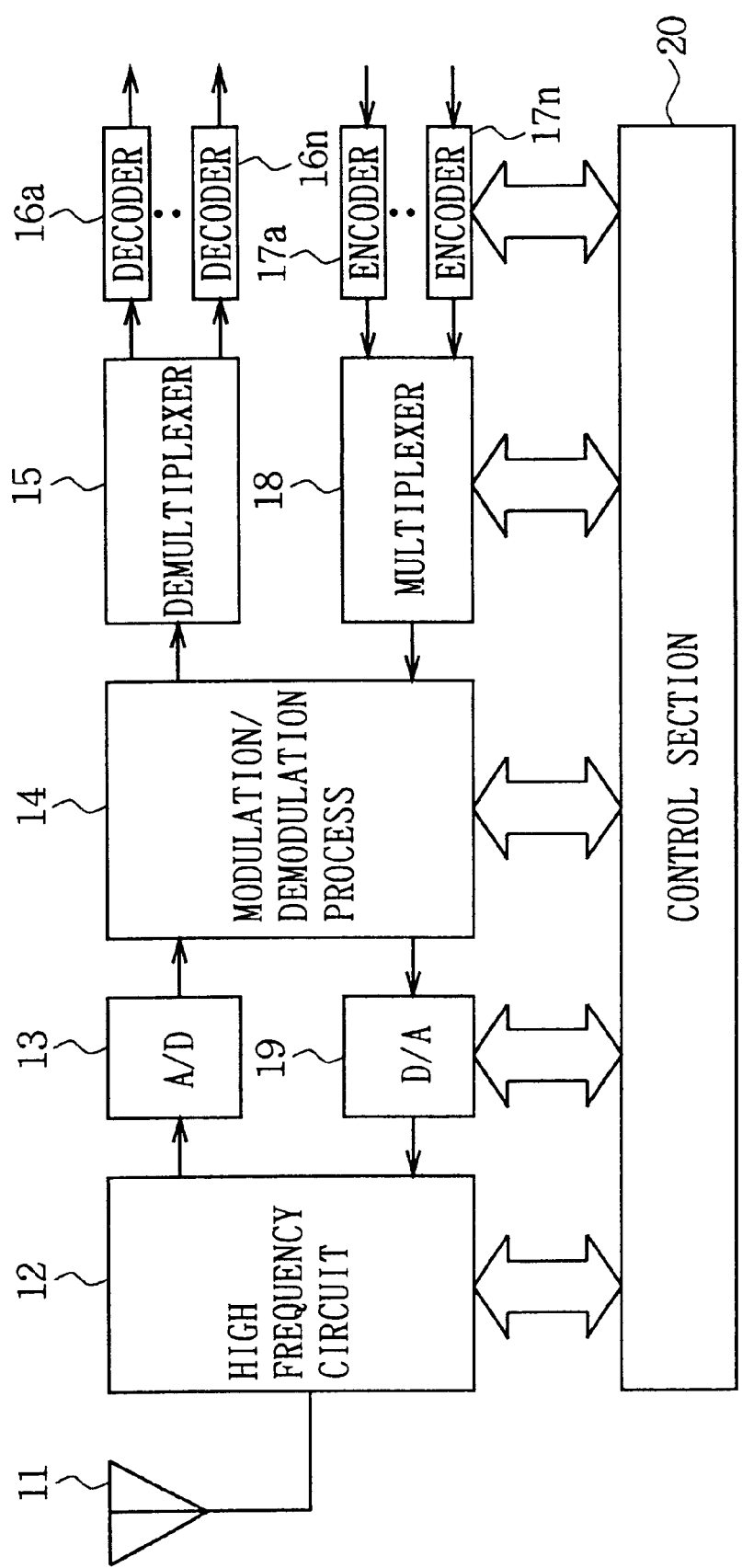
FIG. 4 is a block diagram showing the configuration of a base station according to an embodiment of the present invention.

FIG. 4 is a block diagram showing the entire configuration of a base station according to the present embodiment. In the figure, an antenna 11 used for both transmission and reception is connected with a high frequency circuit 12 to convert a predetermined frequency band signal (a frequency band as used herein is a signal of a unit of transmission composed of, for example, thirty-two band slots) received via the antenna 11 into an intermediate-frequency signal. Said intermediate-frequency signal is further converted by an analog/digital converter 13 into digital data to be supplied to a modulation/demodulation process section 14. The modulation/demodulation process section 14 demodulates a supplied intermediate-frequency signal. Herein the demodulation process is accomplished by performing a demodulation operation such as an orthogonal transformation where data modulated and transmitted separately on twenty-two sub-carriers according to the above-mentioned transmission method is transformed into a series of data. The demodulated data is supplied to a demultiplexer 15 to be separated into pieces of data originally transmitted by the terminals. The separated pieces of data are supplied to separate decoders 16a, 16b, . . . , 16n (n is an arbitrary number), respectively. When separated by the demultiplexer 15, taking into consideration the above-mentioned frequency hopping, each piece of data is supplied to one of the decoders 16a–16n with changing a frequency location (band slot) at any time.

Said decoders 16a–16n are provided correspondingly to the terminals which can be simultaneously connected with a base station, and each of the decoders 16a–16n decodes the data supplied by the corresponding terminal. The decoded data from the decoders 16a–16n is supplied to another communication system (not shown) connected with the base station, and then transmitted to the target destination via the respective terminal and the telephone line. In this connection, a control data such as a connection request to be transmitted from a terminal to a base station, is decoded by any of the decoders 16a–16n and then supplied to a control section 20 of the base station.

Next, the configuration of the transmission system in a base station is described below. For individual transmitting parties, data transmitted from the connected terminals to the base station is separate encoders 17a, 17b, . . . , 17n (n is an arbitrary number), respectively. As well as the decoders, these encoders 17a–17n are provided correspondingly to the terminals which can be simultaneously connected with a base station, and each of the encoders 17a–17n encodes the data supplied by the corresponding terminal. The encoded data from the encoders 17a–17n is supplied to the multiplexer 18. The multiplexer 18 multiplexes all data to be handled by the base station into a series of transmission data. Then, the multiplexer 18 supplies said data to the modulation/demodulation process section 14. The modulation/demodulation process section 14 modulates the supplied data separately on twenty-two sub-carriers. The modulated data is converted by a digital/analog converter 19 into an analog signal, and then supplied to the high frequency circuit 12. The high frequency circuit 12 frequency-translates said analog signal into a predetermined frequency band signal (a frequency band as used herein is a signal of a unit of transmission composed of thirty-two band slots). Said translated signal is wireless transmitted via the antenna 11. In this connection, the control data to be transmitted from the control section 20 of the base station to a terminal is also encoded by any of the encoders 17a–17n, and then processed with the transmission system of the multiplexer 18 through the high frequency circuit 12 for wireless transmission.

In the above-mentioned configuration, wireless communication between the base station and the terminals is established, said communication is controlled by the control section 20 of the base station. The control section 20 comprises a control means such as a microcomputer. The communication with each terminal is controlled by transmitting the control data generated by the control section 20 to the terminal. When each terminal performs a handoff process to switch from one base station to another, that process is performed under the control of the control section 20 in the base station.

Now, the configuration of a terminal which wireless communicates with the base station is described below with reference to FIG. 5.

Figure 5:
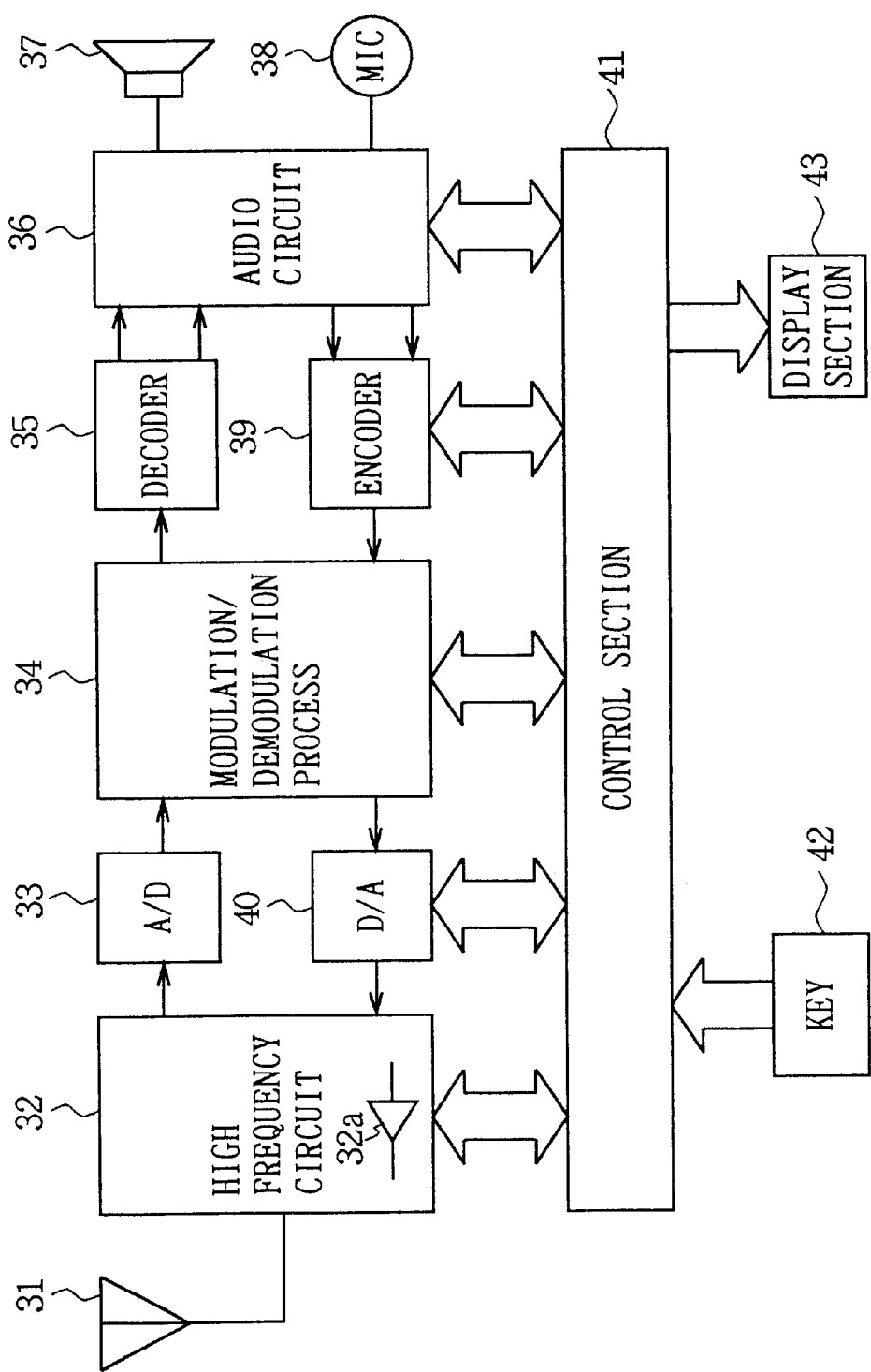
FIG. 5 is a block diagram showing the configuration of a terminal according to an embodiment of the present invention.

FIG. 5 is a block diagram showing the entire configuration of a terminal according to the present embodiment. In the figure, an antenna 31 used for both transmission and reception is connected with a high frequency circuit 32 to convert a predetermined frequency band signal (a frequency band as used herein is a signal of a band slot) received via the antenna 31 into an intermediate-frequency signal. Said intermediate-frequency signal is further converted by an analog/digital converter 33 into digital data to be supplied to a modulation/demodulation process section 34. The modulation/demodulation process section 34 demodulates a supplied intermediate-frequency signal. Herein the demodulation process is accomplished by performing a demodulation operation such as an orthogonal transformation where data modulated and transmitted separately on twenty-two sub-carriers according to the above-mentioned transmission method is transformed into a series of data.

The demodulated data is supplied to a decoder 35. The decoder 35 performs operations such as decoding the data transmitted by the base station. The data decoded by the decoder 35 is supplied to an audio processing circuit 36. The audio processing circuit 36 processes call audio data so as to discharge a generated audio signal via a loudspeaker 37. If the decoded data is the control data from the base station, it is supplied to a control section 41 of said terminal.

Next, the configuration of the transmission system in a terminal is described below. If the data to be transmitted is call audio data, a audio signal picked up by a microphone 38 is supplied to the audio processing circuit 36. The audio processing circuit 36 converts said audio signal into audio data according to a predetermined scheme, and then supplies said audio data to an encoder 39 for encoding. The data encoded by the encoder 39 is supplied to the modulation/demodulation process section 34. The modulation/demodulation process section 34 modulates the supplied data separately on twenty-two sub-carriers. The modulated data is converted by a digital/analog converter 40 into an analog signal, and then supplied to the high frequency circuit 32. The high frequency circuit 32 frequency-translates the analog signal into a predetermined frequency band signal. Said translate signal is wireless transmitted via the antenna 31. In this connection, the control data such as a connection request to be transmitted from the control section 41 of the terminal to a base station is also encoded by the encoder 39, and then processed with the transmission system of the modulation/demodulation process section 34 through the high frequency circuit 32 for wireless transmission. Moreover, during the transmission process of the high frequency circuit 32, the power is amplified to a predetermined level of power by a transmission power amplifier 32a. The gain of the transmission power amplifier 32a can be variably set under the control of the control section 41. Thus, an appropriate gain is set depending on the state of communication with the base station.

The reception state and the transmission state of said terminal are controlled by the control section 41 comprising a control means such as a microcomputer. Said control section 41 checks the control data transmitted by a base station to determine the frequency channel (band slot) used for transmission and reception and the timing for transmission and reception at said frequency channel (time slots in which the transmission and reception are performed). The control section 41 controls each parts in the terminal to operate properly. The control section 41 is also supplied with operational information from a key 42 such as a dialing key. In addition, a display section 43 comprising, for example, a liquid crystal display panel is connected with the control section 41 to display the operational state and other information.

In the foregoing explanation, the terminal shown in FIG. 5 is assumed to transmit and receive call audio data. However, the terminal can transmit or receive other various types of data. For example, the terminal can transmit or receive character data or numerical data, e-mail, or data available from the Internet.

Figure 8:
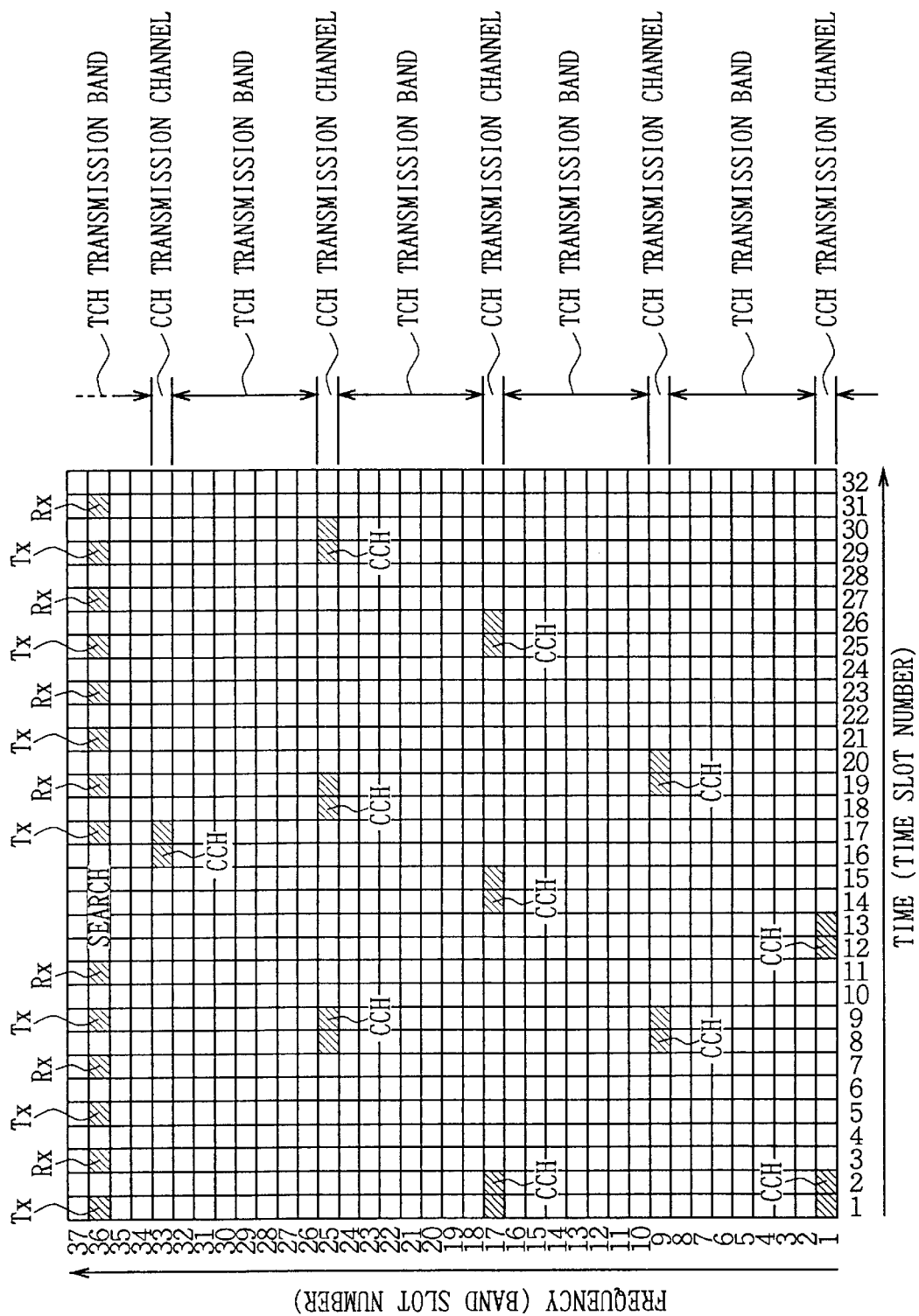
FIG. 8 is an explanatory drawing showing the channel configuration according to an embodiment of the present invention.

Now, the communication between the base station and the terminal as configured above is described below with reference to FIGS. 8–10. FIG. 8 shows an example of channel configuration for communication between the base station and the terminal according to the present embodiment. The ordinate indicates frequencies in band slot numbers, and abscissa indicates the lapse of time in time slot numbers. The band slots and time slots are consecutively numbered.

Herein a band slot located at an interval of eight band slots (the first band slot, the ninth band slot, the seventeenth band slot, the twenty-fifth band slot, the thirty-third band slot, . . . ) is used as a channel dedicated only to communication of control information (control information channel CCH). In other band slots (the second through eighth band slots, the tenth through sixteenth band slots, the eighteenth through twenty-fourth band slots, the twenty-sixth through thirty-second band slots, . . . ), information transmission channel TCH, that is, channel for transmission of user information is transmitted.

In a control information channel CCH located at every eight band slots, all the time slots are not used for transmitting control information and therefore, transmission is controlled by the control section 20 of the base station to be performed at the base station intermittently according to a predetermined rule (or an irregular sequence based on a random number sequence). In case of the present example, a transmission of control information is continued for a period of two time slots. The state of intermittent transmission at each transmission channel among the control information CCHs provided in a base station, is set differently from others. Information of the transmission timing for time slots of a control information CCH in each transmission channel, is transmitted with the control information CCH under the control of the control section 20 of said station. At the control section 41 of a terminal, the transmission timing for time slots of a control information CCH in each transmission channel of said station is determined by receiving a control information CCH of any transmission channel.

In the present embodiment, all base stations for this wireless telephone system (or at least all base stations within a certain area) use the same channel as a frequency channel for a control information channel CCH, and the timing of transmission of control information CCHs at the same channel is set differently between at least adjacent base stations. In this case, a control information CCH transmitted by each base station is accompanied with information of the transmission timing of a control information CCH in another base station adjacent to said base station (for example, information of which frequency channel and which time slot being used to transmit). The control section 41 of each terminal can determine the transmission timing of a control information CCH at each transmission channel in a base station located in another area adjacent to the area for the currently communicating base station.

In band slots used to transmit an information transmission channel TCH, such as the second through eighth band slots, transmission is performed with employing four time slots as a TDMA frame. For this purpose, transmission slots and reception slots each of which is made of a time slot, are provided at an interval of four time slots respectively. When a TDMA frame is made of four time slots in this manner, two terminals can share a transmission channel if transmission and reception are performed at the same frequency, and four terminals can share a transmission channel if transmission is performed at a different frequency from that for reception.

The thirty-sixth band slot in FIG. 8 shows the state of communication between a terminal and a base station and in that band slot. Transmission slots Tx from the base station (to the terminal) and reception slots Rx at the base station (from the terminal) are alternately provided to perform two-way communication between the base station and the terminal. In case of the present example, a data frame is made of thirty-two time slots (eight TDMA frames). At least for a TDMA frame period (a period of four time slots) within said data frame, communication at the transmission slots Tx and the reception slots Rx is stopped in order for the terminal to perform a search operation for available base stations, that is, a so-called cell search.

Figure 9:
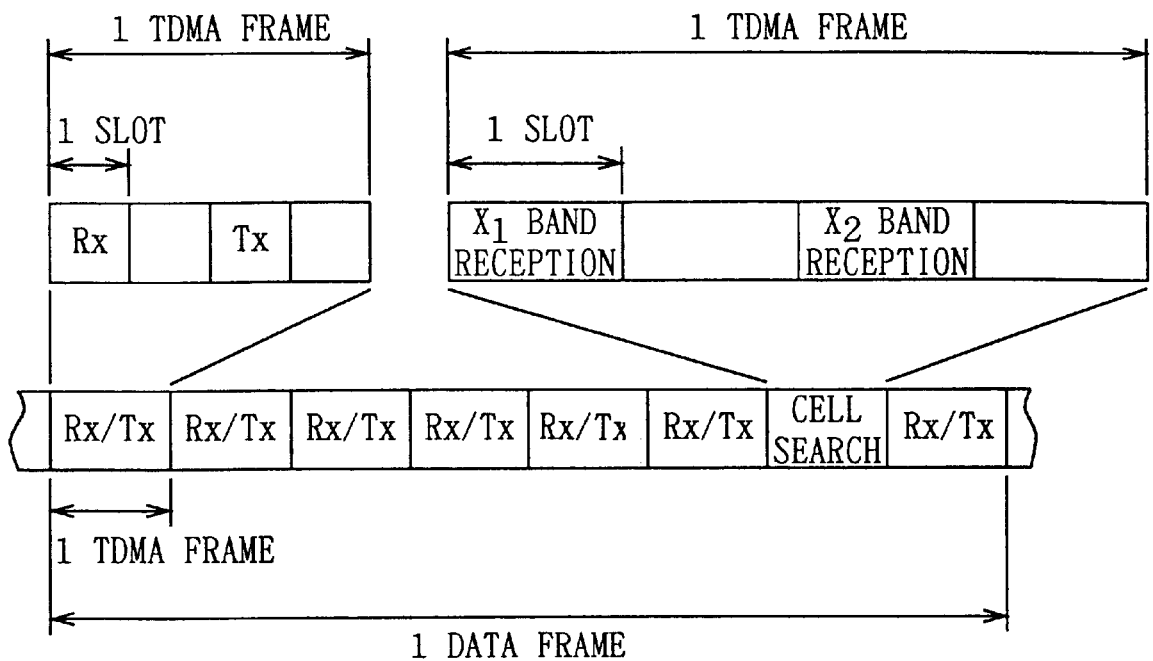
FIG. 9 is an explanatory drawing showing an example of communication timing (normal search) according to an embodiment of the present invention.

FIG. 9 shows the state of communication of a data frame between each terminal and a base station. A data frame is made of eight TDMA frames. Basically, within a period of four time slots in each TDMA frame, reception slots Rx and transmission slots Tx each of which is made of a time slot are provided. In this connection, FIG. 9 shows the timing from the viewpoint of the terminal, and it shows the reception slots Rx and the transmission slots Tx within a TDMA frame in reverse relationship to the timing shown in FIG. 8 which is drawn from the viewpoint of the base station.

In addition, a predetermined arbitrary TDMA frame period within a data frame (the seventh TDMA frame period in FIG. 9) is designated here as a cell search period. Within said cell search period, a control information channel CCH to transmit control information from another base station located in an area adjacent to the area for the currently communicating base station is received. As shown in FIG. 9, for example, within the first period of a time slot in the TDMA frame period for cell search, the reception of a predetermined band slot $X_1$ to transmit a control information channel CCH is attempted. Within the next period of a time slot, the process to switch one channel to another for reception is performed. Within the further next period of a time slot, the reception of another band slot $X_2$ to transmit a control information channel CCH is attempted. Finally, within the last period of a time slot, the process to switch to another channel on which a reception slot Rx is received within the next TDMA frame period is performed.

For example, assume that each control information CCH is transmitted from the home station and peripheral cells in the state as shown in FIG. 8, and that the time slot numbers 13–16 for communication at the channel of the thirty-sixth band slot form a search period. During a period of the time slot number 13, the first band slot is received, so that a control information CCH for said channel can be received. During a period of the time slot 15, the seventeenth band slot is received, so that a control information CCH for this channel can be received.

In this way, during a TDMA, frame period for cell search, at least two channels attempt to receive control information. If channel switching can be performed quickly, all the time slots constituting a TDMA frame can attempt to receive a channel for transmission of respectively different control information channel CCHs (four band slots in a TDMA frame). During the cell search period of each data frame, the channel for attempting the reception is changed, so that for several data frame periods, the reception of control information channel CCHs from all the base stations located adjacent to the currently communicating base station is attempted. Then, during the cell search period, the terminal determines a frequency channel in which the slot for control information CCH exists from control information transmitted by the base station, and then the determined frequency channel is received.

If the slot for control information CCH which is attempted to be received during the cell search period is successfully received, the reception state (for example, reception level) at the point of time is determined by the control section 41 of the terminal, and data of the determined reception state is supplied with information to be transmitted to the base station (for example, data associated with the transmission slot for user information).

The control section 20 of the base station determines whether the location of the current terminal falls within the area of the home station or not by the reception state data for control information transmitted from the terminal. In this manner, each terminal has a cell search period within a data frame, and determines the communication state based on the data obtained during the cell search period so as to ensure efficient cell search. That is, as compared with a prior case where a cell search is always performed within a TDMA frame, since the frequency of cell search can be decreased, more periods available for transmission of user information can be ensured, and the communication capacity can be increased as well as the power necessary for cell search at terminals can be saved.

When the terminal is determined to be located in the vicinity of the boundary between the communication area of that home station and the communication area of another base station through the above-mentioned process (for example, when it is determined that the reception level of signals from the home station at the terminal is substantially equal to the reception level of signals from another base station at the terminal), it is determined whether a handoff process to switch to another base station for communication is required or not.

To determine whether such a handoff process is required or not, the control data is transmitted to an appropriate terminal to increase cell search periods using data associated with transmission slots for user information as well as to decrease the amount of transmitted user information correspondingly to the increase in cell search periods. FIG. 10 shows the communication timing for a data frame from a terminal when the cell search is to be performed more frequently. In the example of FIG. 10, the fifth and seventh TDMA frames in the eight TDMA frames constituting a data frame are designated as cell search periods, and during each period, the cell search operation is performed.

The cell search periods are increased twice with this manner. Thereby, the current communication state of a terminal can be detected more accurately, a quick determination can be made to see whether a handoff process to switch to another base station for communication is required or not, and if required, the handoff process can be handled by the base station quickly. That is, in the present embodiment, during the normal operation, the cell search is performed once for a data frame, which means less frequent cell search than the case where the cell search is performed once for a TDMA frame. On the contrary, if the cell search is recognized to be important, the cell search can be performed equally to or more frequently than the prior case, so that the handoff process can be properly performed. In this connection, FIG. 10 shows the case where the cell search periods within a data frame are increased twice, but more cell search periods can be acceptable depending on the communication state at the point of time.

Moreover, if it can be determined that the state of communication with the home station is even better than that of communication with other base stations with thus increased cell search periods, the number of cell search periods can be reduced to the original level.

Further, in the present embodiment, the gain of the transmission power amplifier 32a in the high frequency circuit 32 of each terminal can be variably set. For example, the gain of the transmission power amplifier 32a is set to a relatively larger value to provide larger transmission power for better communication with the base station if the terminal is determined to be located in the vicinity of the boundary between the communication area of said home station and the communication area of another base station through the above-mentioned process. In case that the transmission power from the base station can be also adjusted, the transmission power can be set to a larger value if the terminal is determined to be located in the vicinity of the boundary between the communication areas as described above.

Figure 10:
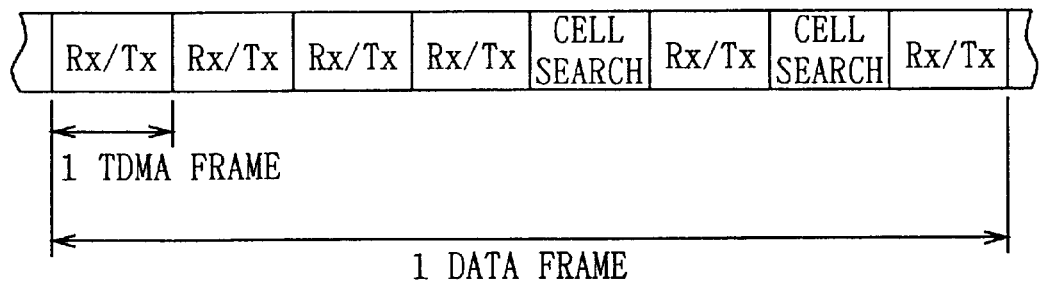
FIG. 10 is an explanatory drawing showing an example of communication timing (more frequent search) according to an embodiment of the present invention.

Moreover, in the present embodiment, if the cell search periods are increased as shown in FIG. 10, the amount of user information data to be transmitted between the base station and the terminal is reduced by the amount corresponding to the decrease in transmission slot period for that user information under the control of the base station. Specifically, since the transmission slots and the reception slots within a data frame period are reduced from seven time slots to six time slots. Thus, the amount of user information data should be reduced to six sevenths. If the cell search periods are decreased, the amount of data should be recovered to the original level. Such a variation in amount of data which can be transmitted, can be addressed by a variation in compression ratio for audio data if user information to be transmitted is audio data, or by changing the data transfer rate temporarily if user information to be transmitted is various types of data including e-mail data.

The amount of user information transmitted can be changed with some factors other than the variation in transmission amount based on the increase or decrease in cell search periods. For example, if the terminal is determined to be located in the vicinity of the boundary between the communication area of that home station and the communication area of another base station, that is, if the base station determines that the state of communication between the current base station and the terminal is relatively worse, under the control of the base station, the state where user information can be transmitted can be maintained by decreasing the transmission rate for data to be transmitted within a time slot. Such a decrease in data transmission rate can be accomplished, for example, by changing the coding method or modulation method.

According to the above-mentioned embodiment, a frequency channel (band slot) for transmitting user information between a base station and a terminal is fixed to a certain frequency channel. However, a technique called frequency hopping can be used to change the transmission frequency channel from one to another for each TDMA frame. Such a technique allows the available transmission bands to be used substantially at even, and with the transmission state kept good, the cell search can be performed properly to ensure desirable characteristics for transmission of user information. Moreover, when the terminal moves into another area, the handoff process can be performed properly to ensure a desirable communication state.

In the above-mentioned embodiment, the details of the communication and frame configurations are shown only by way of example, and they should not be construed to be limited to the above-mentioned embodiment. In particular, according to the above-mentioned embodiment, the present invention is applied to transmission of multicarrier signals and of course, the present invention can be applied to transmission of otherwise modulated signals. Moreover, according to the above-mentioned embodiment, the present invention is applied to a wireless telephone system according to the cellular communication system and of course, the present invention can be applied to other communication systems.

According to the communication method described in claim 1, a terminal needs to perform a search operation for available base stations to receive control information only once in a plurality of predetermined time slot periods for such intermittent communication of user information. Therefore, a desirable search operation can be accomplished at any interval.

According to the communication method described in claim 2, during a search operation, if the terminal is determined to be located in the vicinity of the boundary of the communication area for the currently communicating base station, the number of time slots for communication of the user information is decreased under the control of the base station, and said decreased time slots are used to receive a frequency channel in which the control information is transmitted and to increase the number of periods to perform a search operation for available base stations. Thereby, another base station necessary for a handoff process can be searched for quickly to perform the handoff process properly. Particularly, in case that a relatively longer interval is set for normal search operations, the search operation period can be increased if a handoff process is required, so that a desirable handoff process can be accomplished.

According to the communication method described in claim 3, information of a frequency channel or time slot in which the control information is transmitted from the base station is appended to the control information, and a frequency channel received at the terminal during the search operation for available base stations is determined from the information appended to the control information. Thereby, a frequency channel or time slot received during the search operation can be determined at the terminal.

According to the communication method described in claim 4, a frequency hopping operation is performed to change the frequency channel used for transmission of the user information between the base station and the terminal to a predetermined state in time slots. Thereby, a search operation period can be set properly in the state of an efficient frequency channel being set.

According to the communication method described in claim 5, for communication of the user information and the control information, the information is modulated and transmitted separately on a plurality of sub-carriers within a frequency channel, and said information modulated separately on the plurality of sub-carriers is demodulated at the receiving end. Thereby, a search operation period can be set properly in the state of an efficient transmission being accomplished with multicarrier signals.

According to the communication method described in claim 6, if the terminal is determined to be located in the vicinity of the boundary of the communication area for the currently communicating base station, the communication capacity between the terminal and the base station is decreased under the control of the base station. Thereby, the communication capacity for each terminal can be set properly depending on the location of the terminal and therefore, a desirable communication can be accomplished wherever it is performed.

According to the communication method described in claim 7, the transmission power from the base station or the terminal can be varied depending on the communication state at the point of time. Thereby, the settings of communication capacity and transmission power can provide any desirable communication regardless of situations.

According to the transmission method described in claim 8 and the base station described in claim 18 to which said transmission method is applied, transmission of the user information to a predetermined terminal is performed intermittently in a predetermined time slot period. Further, transmission of the user information is stopped at least once in a plurality of the predetermined time slot periods, and during the time slot periods while the transmission of the user information is stopped, the terminal is caused to perform a search operation for available base stations. Thereby, a desirable control over the terminal can be accomplished.

According to the transmission method described in claim 9 and the base station described in claim 19 to which said transmission method is applied, a handoff process between the base station and the currently communicating terminal can be controlled quickly and properly.

According to the transmission method described in claim 10 and the base station described in claim 20 to which said transmission method is applied, information of a frequency channel or time slot in which the control information is transmitted from the base station, is appended to the control information. Thereby, at the terminal communicating with the base station, a frequency channel or time slot received during the search operation can be determined and therefore, the search operation performed at the terminal can be controlled properly.

According to the transmission method described in claim 11 and the base station described in claim 21 to which said transmission method is applied, a frequency hopping operation is performed to change the frequency channel used for transmission of the user information from the base station to a predetermined state in time slots. Thereby, a search operation period can be set properly at the terminal in the state of an efficient frequency channel being set.

According to the transmission method described in claim 12 and the base station described in claim 22 to which said transmission method is applied, for transmission of the user information and the control information, the information is modulated and transmitted separately on a plurality of sub-carriers within a frequency channel. Thereby, a search operation period can be set properly at the terminal in the state of an efficient transmission being accomplished with multicarrier signals.

According to the reception method described in claim 13 and the terminal described in claim 23 to which said reception method is applied, the terminal needs to perform a search operation for available base stations to receive control information only once in a plurality of predetermined time slot periods for such intermittent communication of user information. Therefore, a desirable search operation for available base stations can be accomplished at any interval.

According to the reception method described in claim 14 and the terminal described in claim 24 to which said reception method is applied, during the search operation, if the terminal is determined to be located in the vicinity of the boundary of the communication area for the currently communicating base station, the number of time slots for reception of the user information is decreased. Said decreased time slots are used to receive a frequency channel in which the control information is transmitted, so that the number of periods to perform a search operation for available base stations is increased. Thereby, another base station necessary for a handoff process can be searched for quickly. Particularly, in case that a relatively longer interval is set for normal search operations, the search operation period can be increased if a handoff process is required, so that a desirable handoff process can be accomplished.

According to the reception method described in claim 15 and the terminal described in claim 25 to which said reception method is applied, a frequency channel received during the search operation for available base stations is determined from information of a frequency channel or time slot, in which the control information is transmitted, appended to said control information. Thereby, a frequency channel or time slot received during the search operation can be easily determined.

According to the reception method described in claim 16 and the terminal described in claim 26 to which said reception method is applied, a frequency hopping operation is performed to change the frequency channel used for reception of the user information to a predetermined state in time slots. Thereby, a search operation period can be set properly in the state of an efficient frequency channel being set.

According to the reception method described in claim 17 and the terminal described in claim 27 to which said reception method is applied, for reception of the user information and the control information, a multicarrier signal formed by modulating the information separately on a plurality of sub-carriers within a frequency channel is received, and said information modulated separately on each sub-carrier is demodulated. Thus, in the state where an efficient transmission is accomplished with multicarrier signals, a search operation period can be set properly.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication method in which user information and control information are provided as information for communicating between a plurality of base stations arranged in a predetermined communication area and a terminal, and in which time slots are formed by sectioning time into predetermined periods of time, and communicating said user information and said control information in time slot units, said communication method comprising the steps of:

communicating said user information between said base stations and said terminal intermittently in a predetermined time slot period to perform intermittent communication;

stopping transmission and reception of said user information at said terminal once in a plurality of said predetermined time slot periods for said intermittent communication; and receiving a frequency channel in which said control information is to be transmitted from said base stations, so as to perform a search operation for available stations, wherein a number of the search operations is increased when a reception level of a signal received at the terminal from a base station with which the terminal is currently communicating is substantially equal to a reception level of signals received from a second base station.

2. The communication method according to claim 1, wherein:

when said terminal is determined to be located in a vicinity of a boundary of the communications area where a currently communicating base station is present by said search operation, decreasing a number of the time slots for communication of said user information under control of said base station, and using a period of said decreased number of time slots to receive the frequency channel in which said control information is to be transmitted, so as to increase a number of the periods of time to perform the search operation for available base stations.

3. The communication method according to claim 1, further comprising the steps of:

appending information of the frequency channel or time slot for said control information to be transmitted from said base station to said control information; and determining the frequency channel received during said search operation for available base stations at said terminal from the information appended to said control information.

4. The communication method according to claim 1, further comprising the step of performing a frequency hopping operation to change the frequency channel used for transmission of said user information between said base stations and said terminal into a predetermined state in a time slot unit.

5. The communication method according to claim 1, further comprising the steps of: for communication of said user information and said control information, modulating said information for transmission separately on a plurality of sub-carriers within a frequency channel and demodulating said information modulated separately on said plurality of sub-carriers at a receiving end.

6. The communication method according to claim 1, wherein the number of search operations is increased during a handoff process.

7. A transmission method for transmitting user information and control information from a plurality of base stations arranged in a predetermined communication area, and forming time slot periods by sectioning time into predetermined periods of time in order to transmit said user information and control information in said time periods, said transmission method comprising the steps of:

performing transmission of said user information to a predetermined terminal intermittently in a predetermined time slot period and stopping transmission of said user information at least once in a plurality of said predetermined time slot periods; and during the time slot periods while said transmission of said user information is stopped, causing said terminal to perform a search operation for available base stations, wherein a number of search operations is increased when a reception level of a signal received at the predetermined terminal from a base station with which the predetermined terminal is currently communicating is substantially equal to a reception level of signals received from a second base station.

8. The transmission method according to claim 7, wherein:

when the currently communicating terminal is determined to be located in a vicinity of a boundary of the communication area where the home station is present by said search operation, decreasing a number of the time slots for transmission of said user information, and using the period of said decreased time slots to increase the number of periods of time to perform a search operation for available base stations at said terminal.

9. The transmission method according to claim 7, comprising the further step of appending information of a frequency channel or time slot in which said control information to be transmitted from said base station to said control information.

10. The transmission method according to claim 7, comprising the further step of performing a frequency hopping operation to change a frequency channel used for transmission of said user information from said base station in a time slot unit.

11. The transmission method according to claim 7, further comprising the step of, for transmission of said user information and said control information, modulating and transmitting said information separately on a plurality of sub-carriers within a frequency channel.

12. The transmission method according to claim 7, wherein the number of search operations is increased during a handoff process.

13. A reception method for receiving user information and control information transmitted from a plurality of base stations arranged in a predetermined communication area, and forming time slots by sectioning time into predetermined periods of time in order to receive said user information and control information in said time slot periods, said reception method comprising the steps of:

performing reception of said user information intermittently in a predetermined time slot period; and stopping reception of said user information once in a plurality of said predetermined time slot periods for said intermittent reception; and receiving a frequency channel in which said control information is to be transmitted from said base stations, so as to perform a search operation for available base stations, wherein a number of, search operations is increased when a reception level of a signal received at a terminal from a base station with which the terminal is currently communicating is substantially equal to a reception level of signals received from a second base station.

14. The reception method according to claim 13, wherein:

when said terminal is determined to be located in a vicinity of a boundary of the communication area where the currently communicating base station is present by said search operation, decreasing a number of the time slots for reception of said user information, and using the period of said decreased time slots to receive a frequency channel in which said control information is to be transmitted, so as to increase a number of the periods of time to perform the search operation for available base stations.

15. The reception method according to claim 13, further comprising the step of determining a frequency channel received during said search operation for available base stations from information of a frequency channel to time slot for transmitting said received control information and being appended to said received control information.

16. The reception method according to claim 13, further comprising the step of performing a frequency hopping operation to change a frequency channel used for reception of said user information into a predetermined state in a time slot unit.

17. The reception method according to claim 13, further comprising the steps of, for reception of said user information and said control information, receiving a multicarrier signal formed by modulating said information separately on a plurality of sub-carriers within a frequency channel, and demodulating the information modulated separately on search sub-carrier.

18. The reception method according to claim 13, wherein the number of search operations is increased during a handoff process.

19. A base station for communicating user information to a terminal and for transmitting control information to said terminal comprising:

user information processing means and control information processing means;

means for forming time slots by sectioning time into predetermined periods of time, and performing operations for transmission and reception of user information by said user information processing means and for transmission of control information by said control information processing means in said time slot period;

means for performing transmission and reception of said user information between said terminal and said base station in said user information processing means intermittently in a predetermined time slot period, and for stopping transmission and reception of said user information at least once in a plurality of said predetermined time slot periods; and means for transmitting a control command to said terminal to perform a search operation for available base stations, during the time slot periods transmission and reception of said user information stops, based on said control information transmitted by said control information processing means, wherein a number of search operation is increased when a reception level of a signal received at the terminal from the base station with which the terminal is currently communicating is substantially equal to a reception level of signals received from a second base station.

20. The base station according to claim 19, wherein when said control information processing means determines that a currently communicating terminal is located in a vicinity of a boundary of a communication area where the home station is present, said user information processing means decreases the number of time slots for transmission and reception of said user information, and by using the period of said decreased time slots, said control information processing means appends a control command to increase the number of periods of time for performing a search operation for available base stations in said terminal to said control information.

21. The base station according to claim 19, wherein:

said control information processing means appends information of a frequency channel or time slot in which said control information is to be transmitted by said control information processing means to said control information.

22. The base station according to claim 19, further comprising means for performing a frequency hopping operation to change a frequency channel used for transmission and reception of said user information in said user information processing means into a predetermined state in a time slot unit.

23. The base station according to claim 19, wherein said means for transmission and reception of said user information and said control information processed by said user information processing means and said control information processing means includes means for modulating and transmitting said information separately on a plurality of sub-carriers within a frequency channel.

24. The base station according to claim 19, wherein the number of search operations is increased during a handoff process.

25. A terminal for transmitting and receiving user information and receiving control information transmitted by a plurality of base stations arranged in a predetermined communication area, and forming time slots by sectioning time into predetermined periods of time in order to transmit and receive user information and receive control information in said time slot unit; said terminal comprising:

user information processing means and control information processing means;

means for performing transmission and reception of said user information in said user information processing means intermittently in a predetermined time slot period and for stopping transmission and reception of said user information once in a plurality of said predetermined time slot periods for said intermittent transmission and reception; and during periods while said transmission and reception stops, a frequency channel in which said control information to be transmitted from said base stations is received by said control information processing means so as to perform a search operation for available base stations, wherein a number of search operations is increased when a reception level of a signal received at the terminal from a base station with which the terminal is currently communicating is substantially equal to a reception level of signals received from a second base station.

26. The terminal according to claim 25, wherein when a home station is determined to be located in a vicinity of a boundary of the communication area where the currently communicating base station is present by said search operation with said control information processing means, said user information processing means decreases a number of time slots for reception of said user information, and by using a period of said decreased time slots, said control information processing means receives a frequency channel in which said control information is to be transmitted in order to increase a number of periods of time to perform a search operation for available base stations.

27. The terminal according to claim 25, further comprising means for determining the frequency channel received during said search operation for available base stations based on a determination on information of a frequency channel or time slot to be appended to said control information by said control information processing means.

28. The terminal according to claim 25, further comprising means for performing a frequency hopping operation to change a frequency channel used for transmission and reception by said user information processing means into a predetermined state in a time slot unit.

29. The terminal according to claim 25, wherein for reception of said user information and said control information by said user information processing means and said control information processing means, said user information processing means receiver a multicarrier signal formed by modulating said information separately on a plurality of sub-carriers within a frequency channel, so as to demodulate said modulated information separately on each sub-carrier.

30. The terminal according to claim 25, wherein the number of search operations is increased during a handoff process.

* * * * *